Jan. 12, 1971     G. W. GORMAN     3,554,569
DYNAMIC PRESSURE SEAL DEVICES
Original Filed Feb. 8, 1967
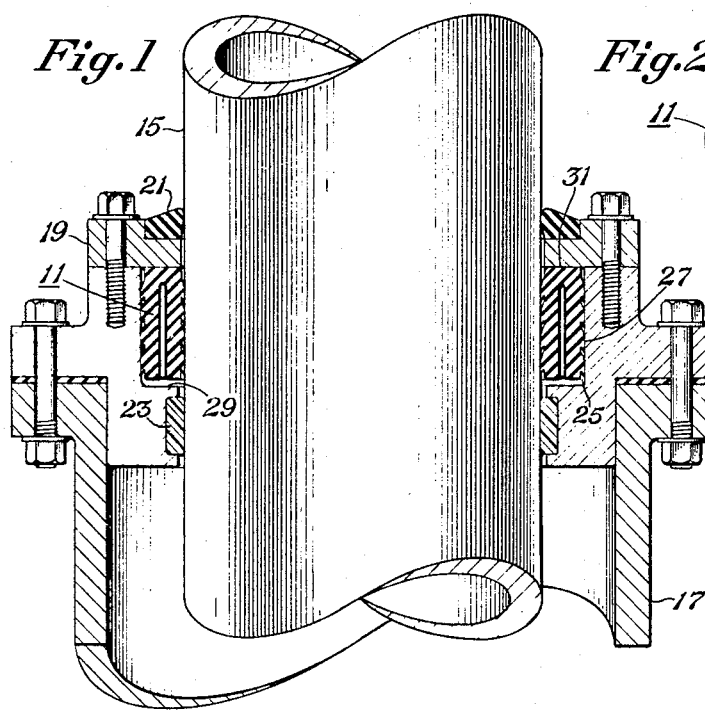
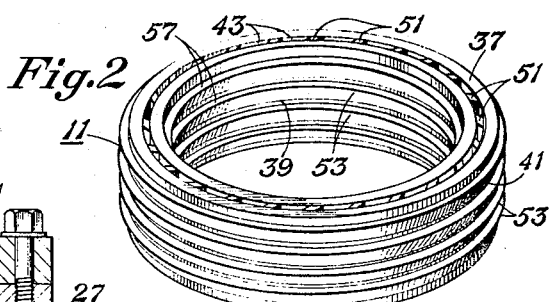
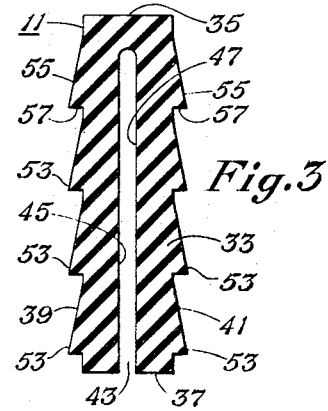
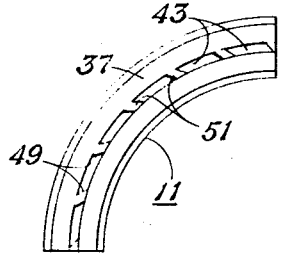
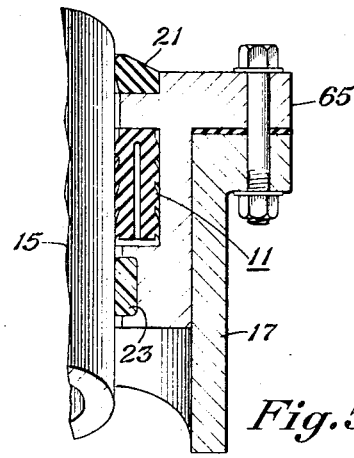
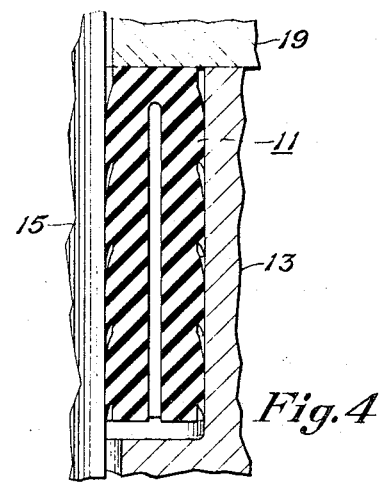
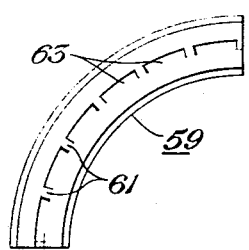
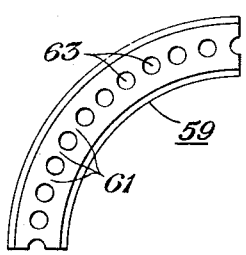
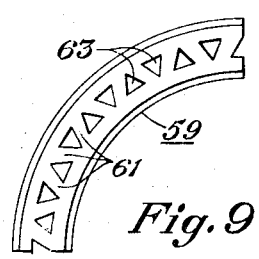
INVENTOR
Gerald W. Gorman
BY
Wofford & Felsman
ATTORNEYS United States Patent Office 3,554,569
Patented Jan. 12, 1971

3,554,569
DYNAMIC PRESSURE SEAL DEVICES
Gerald W. Gorman, Rte. 2, Midlothian, Tex. 76065
Continuation of application Ser. No. 614,710, Feb. 8, 1967. This application Aug. 4, 1969, Ser. No. 849,580
Int. Cl. F16j 15/32
U.S. Cl. 277—205                               6 Claims

ABSTRACT OF THE DISCLOSURE

Seal devices of generally annular form having inner and outer sides each carrying one or more sealing lips, a closed end face, and an open end face, the openings of which are entries to cavities which are separated by ribs that are symmetrically disposed about the seal device central axis. In some embodiments, the total area of the cavity inner and outer sidewalls is specially related to the total area of the open end face to establish a "controlled counterpressure" condition. In a preferred embodiment, the ribs are slanted to achieve an internal spring action.

---

This is a continuation of application Ser. No. 614,710, filed Feb. 8, 1967, now abandoned.

BACKGROUND OF THE INVENTION

Fluid seal devices of a type suitable for use with a rod and cylinder under pressure loading conditions have in the past often comprised a stack of seal elements, such as conventional V-type packing elements. Such prior art seal devices are subject to a number of disadvantages, including tendency to fatigue failure due to movement under pressure load variations, increase in friction area and consequently wear with pressure load increase, tendency toward extrusion and deformation resulting in increased wear, and limited maximum pressure load capability. The instant invention encompasses improvements which diminish these disadvantages.

BRIEF DESCRIPTION OF DRAWING

FIG. 1 is a schematic elevational view, partly in section, showing a seal device in accordance with a preferred embodiment of the invention in a typical installation; FIG. 2 is a schematic perspective view of a seal device in accordance with a preferred embodiment of the invention; FIG. 3 is an enlarged schematic view showing the cross-section of the seal device of FIG. 2; FIG. 4 is an enlarged view of a portion of FIG. 1, showing details of the cross-section of the sealing device of FIG. 2 in the installed condition; FIG. 5 is a schematic fragmentary elevational view, partly in section, showing a modified form of a typical installation for the seal device of FIG. 2; FIG. 6 is a schematic fragmentary end view of the seal device of FIG. 2; and FIGS. 7, 8 and 9 are schematic fragmentary end views of seal devices in accordance with other embodiments of the invention.

DESCRIPTION OF THE PREFERRED EMBODIMENTS

FIG. 1 shows a seal device 11 in a typical installation, sealing between the cylinder head 13 and jack plunger 15 in a hydraulic elevator apparatus. The jack plunger 15 supports the elevator car and movement of the plunger is controlled by pressure of hydraulic fluid within the jack cylinder 17. The cylinder head 13 is secured to the upper end of the cylinder 17 in a conventional manner. A cap ring 19 is secured to the upper end of the cylinder head 13 in a conventional manner, and carries a conventional wiper ring 21. Conventional guide means to limit lateral movement of the jack plunger 15 include a guide ring 23 which is carried by the cylinder head 13.

An annular cavity 25 having rectangular cross-section shape is formed by an inner peripheral cylindrical face 27 of the cylinder head, a planar ring shaped upper face 29 of an inwardly extending flange portion of the cylinder head 13, a planar ring shaped lower face portion 31 of the cap ring 19, and a portion of jack plunger exterior surface. A seal device 11 in accordance with a preferred embodiment of the instant invention, is disposed within this cavity 25.

Referring now to FIGS. 2, 3 and 6, it may be seen that the seal device 11 is generally in the form of a ring having a body 33, a closed end face 35, an open end face 37, an inner side 39 and outer side 41. The closed end face 35 as shown is planar, lying in a plane transverse to the ring central axis. The open end face 37, as shown, is planar, lying in a plane transverse to the ring central axis, and has a plurality of openings therein, each of which is the entry of a cavity 43. Each cavity 43 has an inner side wall 45, an outer side wall 47 and end walls 49. The cavities 43 are symmetrically disposed within the seal device body 33, so that the wall thickness between a cavity outer side wall 47 and the body outer side 41 is substantially equal to the wall thickness between a cavity inner side wall 45 and the body inner side 39. The body material between adjacent cavities forms ribs 51. Adjacent ribs 51 have substantially equal wall thickness. The cavity depths are substantially equal; with the cavity bottoms being a distance from the closed end face 35 that is approximately the same as the distance between a cavity side wall 45, 47 and a corresponding body side 39, 41. The transverse section areas of the cavities 43 are substantially uniform throughout the cavity length. The central planes of the ribs 51 are slanted with respect to the cavity side walls 45, 47, so that the cavity transverse section area shape is generally like a parallelogram. Integral with the seal device body 33, disposed at uniformly spaced intervals on the inner side 39 and outer side 41 and extending outwardly therefrom, are a plurality of sealing lips 53. Each sealing lip has a side surface 55 which diverges outwardly from the body 33 in the direction away from the closed end face 35 and merges with an end surface 57 that is in a plane transverse to the body central axis.

The seal device 11 in a typical installation, as shown in FIGS. 1 and 4, has its closed end face 35 bearing on a seat or stop such as the lower face portion 31 of the cap ring 19, the sealing lips 53 on its outer side 41 bearing on one working surface such as the cylinder head cylindrical face 27 and the sealing lips 53 on its inner side 39 bearing on the other working surface such as the exterior surface of the jack plunger 17. The seal device 11 is designed to make an interference fit with the working surfaces such that approximately two-thirds of the sealing lip side surface 55 is in contact with the working surface under the no load condition. The sealing device open end face 37, and cavities 43 are exposed to the working pressure of the fluid to be sealed.

Actual dimensions of several sizes of typical seal devices embodying the present invention are tabulated below, with dimensions defined as follows: A—inside diameter of working surface that is to receive the seal device; B—outside diameter of working surface that is to receive the seal device; C—maximum diameter of seal device; D—minimum diameter of seal device; E—minimum distance between cavity inner or outer side wall and body inner or outer side wall; F—distance between cavity inner and outer side walls; G—length of seal device; H—seal device lip length; I—distance between cavity bottom and seal device closed end face; J—seal device lip interference; K—seal device heel clearance length; L—angle between lip side surface and seal device central axis; M—distance between end walls of adjacent cavities, or rib thickness; N— number of ribs; O—heel clearance length between adjacent seal device lips; P—acute angle between cavity end wall and tangent to cavity inner side wall at junction of cavity end wall and inner side wall.

|  | Seal device | | | | |
| --- | --- | --- | --- | --- | --- |
|  | First | Second | Third | Fourth | Fifth |
| Dimension inches or degrees: | | | | | |
| A | 0.7500 | 2.5000 | 5.5000 | 7.0000 | 12.6250 |
| B | 1.1250 | 3.1250 | 6.5000 | 8.0000 | 13.6250 |
| C | 1.1450 | 3.1550 | 6.5250 | 8.0250 | 13.6500 |
| D | 0.7300 | 2.4700 | 5.4750 | 6.9750 | 12.6000 |
| E | 0.0630 | 0.1250 | 0.1700 | 0.1700 | 0.1700 |
| F | 0.0500 | 0.0625 | 0.1450 | 0.1450 | 0.1450 |
| G | 0.5000 | 0.7500 | 0.7500 | 0.7500 | 0.7500 |
| H | 0.1250 | 0.1562 | 0.1870 | 0.1870 | 0.1870 |
| I | 0.1000 | 0.1250 | 0.1700 | 0.1700 | 0.1700 |
| J | 0.0300 | 0.0400 | 0.0400 | 0.0400 | 0.0400 |
| K | 0.0600 | 0.0625 | 0.1250 | 0.1250 | 0.1250 |
| L | 18° | 15° | 18° | 18° | 18° |
| M | 0.0625 | 0.1562 | 0.1250 | 0.1250 | 0.1250 |
| N | 15 | 24 | 36 | 45 | 72 |
| O | 0.0300 | 0.0312 | 0.0625 | 0.0625 | 0.0625 |
| P | 45° | 45° | 45° | 45° | 45° |

An important concept of the instant invention is that the total area of the sealing device cavity inner and outer side walls (hereinafter sometimes called first area) can be related to the total area of the open end face (hereinafter sometimes called second area) to achieve significant advantages. The first area and second area can be related so that the total force resulting from fluid pressure acting on the second area and tending to compress the seal device axially will be essentially balanced by the total force resulting from fluid pressure acting on the first area and tending to compress the seal device radially, with the result that there is essentially no deformation of the seal device when the fluid pressure is applied. Also, the first area and second area can be related so as to achieve a controlled or predetermined amount of deformation under pressure loading in applications where this is desirable. This concept will be sometimes referred to herein as the "controlled counter-pressure" concept.

The less deformation due to pressure loading that a sealing device can have, the less fatiguing tendency due to pressure load variations there will be. Sealing devices utilizing the "controlled counter-pressure" concept of the instant invention will have minimum fatiguing tendency because they will experience minimum deformation. Because of their minimum or controlled deformation characteristics, such sealing devices of the instant invention in service always maintain essentially their no load sealing lip interference fit configuration. This means that the compression of the sealing lips is not significantly increased with increase in pressure load, and consequently the friction load between the lips and the working surfaces does not increase with increase in pressure load. Because of their minimum or controlled deformation characteristics, such sealing devices of the instant invention do not tend to extrude and friction wear and abrasion that could result from excessive extrusion is avoided. It has been found in actual practice that sealing devices utilizing the "controlled counter-pressure" concept of the instant invention have superior maximum pressure load capability. For example, they are routinely employed in applications with working pressures up to 3000 p.s.i., and they have been successfully tested at pressures up to 8000 p.s.i.

I have found it convenient and practicable to express the pressure relationships involved in the "controlled counter-pressure" concept in terms of the percentage of the total area of the open end face (second area) that is cavity end face area (sometimes herein referred to as third area). This percentage will be hereinafter sometimes called "controlled counter-pressure percentage factor" or simply "percentage factor." I have found that the "percentage factor" should be between 15 and 35 percent.

As the "percentage factor" is decreased below 15 percent the maximum capability rapidly decreases due to the tendency of open end face pressure to cause deformation and extrusion. As the "percentage factor" is increased above 35 percent, the maximum pressure capability rapidly decreases due to the tendency of pressure inside the cavities to produce excessive swelling deformation. A "percentage factor" in the range from 20 to 30 percent would be desirable in most cases.

Another important concept of the instant invention is the provision of ribs disposed symmetrically about the seal device central axis and defining cavity end walls. The provision of such ribs significantly adds to the capability of the seal device to retain its basic shape and position without detracting from other desirable seal device characteristics.

A significant feature of the instant invention illustrated by the embodiment shown by FIGS. 2 and 6 is the internal spring action deriving from the slanted rib configuration. By "slanted rib configuration" is meant that the plane of the rib forms an acute angle with the plane containing the central axis of the seal device and passing through a particular end of the respective ribs forming an end wall for the cavity. Preferably the acute angle is within the range of thirty to sixty degrees. This slanted rib configuration makes possible considerable relative movement between the cavity inner and outer side walls without undue compression of the seal material. This means that when the seal device is installed, the cavity inner and outer side walls may be moved toward each other sufficiently to produce effective internal spring action. This internal spring action tends to insure a proper interference fit between the sealing lips and working surfaces under the no load condition, and also to enhance seal device operation under varying load pressure conditions. This internal spring action is particularly desirable when the seal device material has little inherent hoop tension.

The seal device material is preferably rubber or rubber-fabric composition. While the slant-rib and resulting cavity configuration as shown by FIGS. 2 and 6 is preferred, other rib and resulting cavity configurations will occur to those skilled in the art within the scope of the instant invention. In FIGS. 7, 8 and 9, there are shown schematic fragmentary end views of seal devices having ribs and cavities of modified form.

In the embodiments shown by the drawings, the cavity walls are essentially mutually parallel. However, it is within the scope of the instant invention to have cavity side walls that are tapered and to have cavities which do not have uniform transverse section areas throughout their lengths. Also, in embodiments shown by the drawings, the seal device end faces are planar, mutually parallel, and perpendicular to the seal device central axis. However, the closed end face may have various seating configurations, as for example a V-shape to mate with a V-groove in the cap ring (or equivalent) lower face portion 31 (see FIG. 1). Also, the open end face need not necessarily be planar, but may have various configurations, as for example, a taper converging toward the cavity bottoms.

In the embodiments shown by the drawing, the seal device inner and outer sides 39, 41 (see FIG. 3) each carry a plurality of sealing lips 53. However, within the scope of the instant invention, there may be only one sealing lip on each side, and it may merge with the respective open end face side portion.

The installation of the seal device 11 as shown by FIG. 5 is identical to that of FIG. 1, except that the cylinder head and cap ring are one integral piece 65. One of the advantages of seal devices of the instant invention is that they may be distorted and snapped into place in the receiving annulus, thus eliminating the necessity for a removable cap ring.

It will be apparent to those skilled in the art that the instant invention may be utilized in both rod and piston applications.

The foregoing disclosure and the showings made in the drawing are merely illustrative of the principles of this invention and are not to be interpreted in a limiting sense.

What is claimed is:

1. A fluid seal device of a type suitable for use in sealing an annular space between an internal surface of a cylinder and a member having an outer cylindrical surface disposed therewithin, comprising:
   (a) an annular body having an inner side and an outer side, each carrying at least one sealing lip, a closed end face, and an open end face;
   (b) means defining a plurality of cavities symmetrically disposed about the central axis of said body, with each cavity opening at said open end face and extending longitudinally of said body to a depth near the level of the extremity of said sealing lip nearest said closed end face, said means including ribs symmetrically disposed about the central axis of said body with each rib defining end walls of adjacent cavities, the percentage of the total area of the open end face that is cavity end face being within the range of fifteen to thirty-five percent.

2. A fluid seal device as set forth by claim 1, wherein said cavities each have an inner and an outer side wall that are substantially parallel to each other, and the end walls of respective ones of adjacent cavities defined by said ribs are substantially parallel to each other, and the central planes of said ribs between said respective adjacent end walls are slanted at a constant angle to the respective plane containing said body central axis and passing through a said respective adjacent end wall, so that said seal device will exhibit internal spring action.

3. A fluid seal device as set forth by claim 2 wherein said constant angle is an acute angle within the range of thirty to sixty degrees.

4. A fluid seal device as set forth by claim 1, wherein the percentage of the total area of the open end face that is cavity end face area is within the range of twenty to thirty.

5. A fluid seal device as set forth by claim 4, wherein said cavities each have an inner and an outer side wall that are substantially parallel to each other, and the end walls of respective ones of adjacent cavities defined by said ribs are substantially parallel to each other, and the central planes of said ribs between said respective adjacent end walls are slanted at a constant angle to the respective plane containing said body central axis and passing through a said respective adjacent end wall, so that said seal device will exhibit internal spring action; and wherein there are a plurality of sealing lips, each said cavity extending longitudinally of the body to a depth near the level of the extremity of said sealing lips and approaching said closed end face whereby the pressure acting on the said inner side and said outer side of each said cavity compresses said inner side and said outer side against the respective cylindrical surfaces to effect a controlled counter pressure to oppose the tendency of the fluid pressure to compress axially said seal device at high pressure.

6. A fluid seal device as set forth by claim 5, wherein said constant angle is an acute angle within the range of thirty to sixty degrees.

References Cited

UNITED STATES PATENTS

| 1,802,177 | 4/1931 | Knight. |
| 2,475,967 | 7/1949 | Jeske. |
| 2,660,459 | 11/1953 | Collins. |
| 2,832,223 | 4/1958 | Couraud. |
| 2,841,429 | 7/1958 | McCuiston. |
| 2,979,350 | 4/1961 | Lansky. |

FOREIGN PATENTS

| 660,715 | 4/1963 | Canada. |

LAVERNE D. GEIGER, Primary Examiner

J. S. MEDNICK, Assistant Examiner

U.S. Cl. X.R.

277—207, 209